(12) United States Patent
Nagata et al.

(10) Patent No.: US 8,311,480 B2
(45) Date of Patent: Nov. 13, 2012

(54) MOBILE DEVICE SYSTEM AND MOBILE DEVICE

(75) Inventors: Hideki Nagata, Hachioji (JP); Hiroyuki Minakata, Hachioji (JP); Takayuki Ide, Fussa (JP); Atsushi Kohashi, Akiruno (JP); Minoru Omaki, Kunitachi (JP)

(73) Assignee: Olympus Corporation, Tokyo (JP)

( * ) Notice: Subject to any disclaimer, the term of this patent is extended or adjusted under 35 U.S.C. 154(b) by 957 days.

(21) Appl. No.: 11/903,844

(22) Filed: Sep. 24, 2007

(65) Prior Publication Data

US 2008/0081649 A1 Apr. 3, 2008

(30) Foreign Application Priority Data

Sep. 28, 2006 (JP) ................................. 2006-264745

(51) Int. Cl.
*H04B 7/00* (2006.01)
(52) U.S. Cl. .................. 455/41.2; 455/41.1; 455/552.1; 455/556.1; 455/456.1; 455/466; 455/557; 455/456.7; 455/418; 455/414.1; 455/553.1; 340/572; 340/539; 340/539.11; 340/686.1; 340/686.6
(58) Field of Classification Search .................. 455/41.2, 455/456.1, 435.1, 518; 370/351, 381, 382
See application file for complete search history.

(56) References Cited

U.S. PATENT DOCUMENTS

| 6,671,620 | B1 * | 12/2003 | Garin et al. ................... 701/213 |
| 7,277,049 | B2 * | 10/2007 | Korneluk et al. ........ 342/357.09 |
| 7,292,184 | B2 * | 11/2007 | Uozumi .................. 342/357.09 |
| 2003/0096628 | A1 * | 5/2003 | Bar-On et al. ................. 455/518 |
| 2003/0163359 | A1 * | 8/2003 | Kanesaka .......................... 705/8 |
| 2005/0096084 | A1 * | 5/2005 | Pohja et al. ................. 455/556.1 |

FOREIGN PATENT DOCUMENTS

| JP | 2002-9879 | 1/2002 |
| JP | 2006-60544 | 3/2006 |
| WO | 2006/076349 | 7/2006 |

OTHER PUBLICATIONS

Chinese Office Action, dated Mar. 24, 2010, issued in corresponding Chinese Patent Application No. 200710153540.3.

* cited by examiner

*Primary Examiner* — Matthew Anderson
*Assistant Examiner* — Ganiyu A Hanidu
(74) *Attorney, Agent, or Firm* — Kenyon & Kenyon LLP

(57) ABSTRACT

A mobile device system includes a plurality of mobile devices, each to which unique identification information is assigned, wherein each mobile device includes a location-information acquisition unit, a communication unit, and a group registration unit. The communication unit links location information acquired by the location-information acquisition unit of the mobile device and the identification information of the mobile device, sends the information to other mobile devices, and receives from the other mobile devices location information of the other mobile devices and identification information linked to the location information of the other mobile devices. The group registration unit detects other mobile devices located within a predetermined range of the mobile device on the basis of the location information of the other mobile devices and the location information of the mobile device and registers the identification information of the detected other mobile devices as a group.

8 Claims, 4 Drawing Sheets

| IDENTIFICATION INFORMATION | DEVICE | IP ADDRESS | ICON |
|---|---|---|---|
| 0 0 0 4 | PORTABLE MUSIC PLAYER | * * * * * | |
| 0 0 0 5 | PDA | * * * * * | |
| 0 0 0 6 | LAPTOP COMPUTER | * * * * * | |

MOBILE DEVICE SYSTEM AND MOBILE DEVICE

BACKGROUND OF THE INVENTION

1. Field of the Invention

The present invention relates to a mobile device system and a mobile device that are capable of handing a plurality of mobile devices as a group.

This application is based on Japanese Patent Application No. 2006-264745, the content of which is incorporated herein by reference.

2. Description of Related Art

Recently, due to the diversification of information, when people go out, in many cases, they carry multiple mobile devices having various functions, such as mobile phones, laptop computers, information communication terminals, digital cameras, and music players (see Japanese Unexamined Patent Application, Publication No. 2002-9879).

Along with this trend, a technology for preventing users from forgetting to carry a mobile device when going out and misplacing a mobile device outside the home has been proposed (see Japanese Unexamined Patent Application, Publication No. 2006-60544).

For example, Japanese Unexamined Patent Application, Publication No. 2006-60544 discloses a technology for periodically sending and receiving location information between a wireless key and a communication phone terminal, determining the distance therebetween on the basis of the information, and providing an alert when the determined distance becomes longer than a predetermined value when the user forgets to carry the mobile device.

BRIEF SUMMARY OF THE INVENTION

A first aspect of the present invention provides a mobile device system including a plurality of mobile devices, to each of which unique identification information is assigned. Each mobile device includes a location-information acquisition unit configured to acquire location information, a communication unit configured to communicate with other mobile devices, and a group registration unit. In each mobile device, the communication unit links location information acquired by the location-information acquisition unit of the mobile device and the identification information of the mobile device, sends the information to other mobile devices, and receives from the other mobile devices location information of the other mobile devices and identification information linked to the location information of the other mobile devices. In each mobile device, the group registration unit detects other mobile devices located within a predetermined range of the mobile device on the basis of the location information of the other mobile devices received by the communication unit and the location information of the mobile device and registers the identification information of the detected other mobile devices as a group.

A second aspect of the present invention provides a mobile device including a location-information acquisition unit configured to acquire location information, a communication unit configured to communicate with other mobile devices, and a group registration unit. The communication unit links location information acquired by the location-information acquisition unit of the mobile device and the identification information of the mobile device, sends the information to other mobile devices, and receives from the other mobile devices location information of the other mobile devices and identification information linked to the location information of the other mobile devices. The group registration unit detects other mobile devices located within a predetermined range of the mobile device on the basis of the location information of the other mobile devices received by the communication unit and the location information of the mobile device and registers the identification information of the detected other mobile devices as a group.

DETAILED DESCRIPTION OF THE INVENTION

Figure 1:
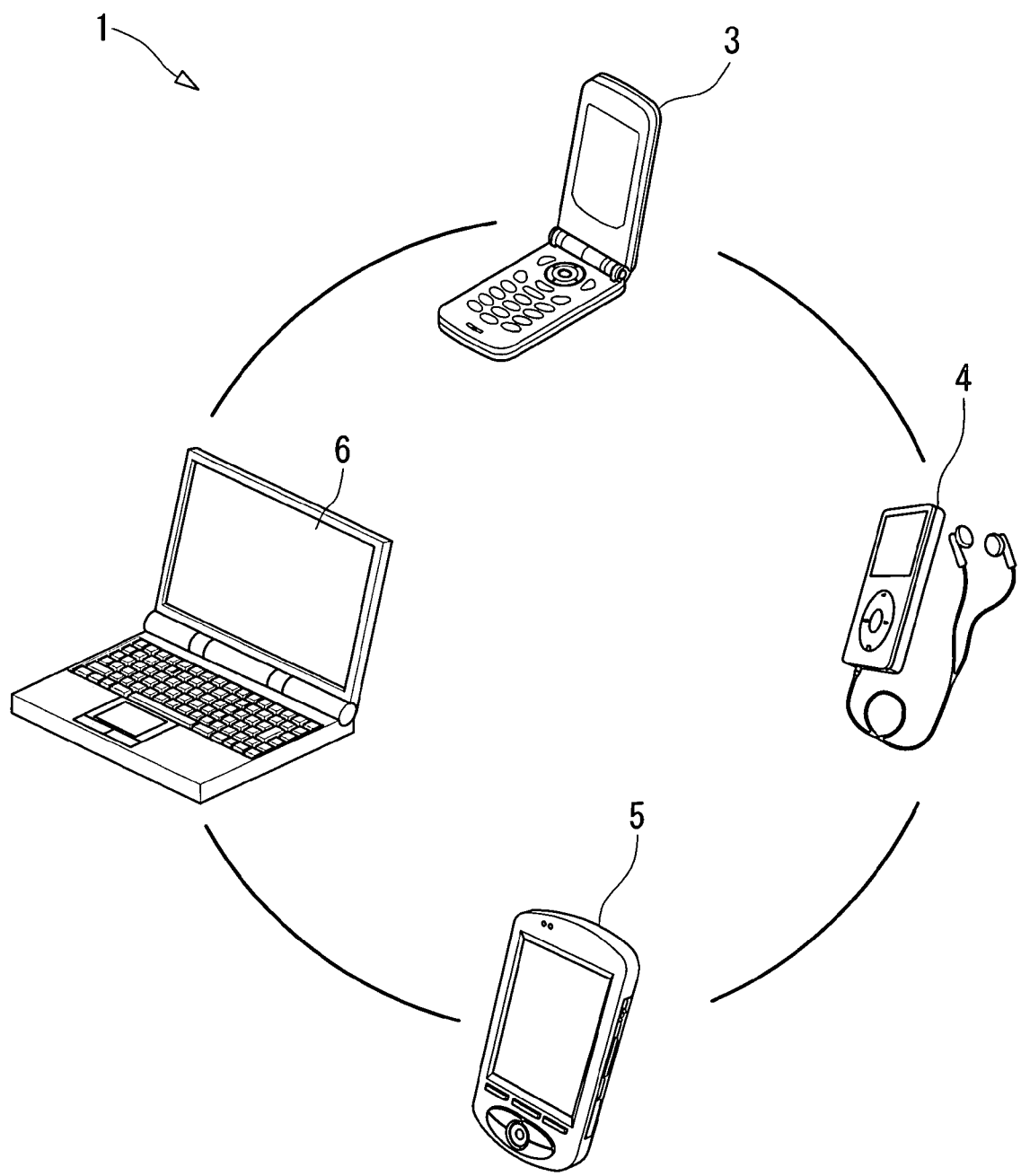
FIG. 1 illustrates the structure of a mobile device system.

A mobile device system according to the present invention includes a plurality of mobile devices, to each of which unique identification information is assigned. Each mobile device includes a location-information acquisition unit configured to acquire location information, a communication unit configured to communicate with other mobile devices, and a group registration unit. In each mobile device, the communication unit links location information acquired by the location-information acquisition unit of the mobile device and the identification information of the mobile device, sends the information to other mobile devices, and receives from the other mobile devices location information of the other mobile devices and identification information linked to the location information of the other mobile devices. In each mobile device, the group registration unit detects other mobile devices located within a predetermined range of the mobile device on the basis of the location information of the other mobile devices received by the communication unit and the location information of the mobile device and registers the identification information of the detected other mobile devices as a group.

According to this structure, by operating the communication unit, the communication unit is operated to send location information acquired by the location-information acquisition unit of each mobile device to other mobile devices. In this way, location information of each mobile device is received and sent among each other. In each mobile device, other mobile devices within the predetermined range are detected on the basis of the location information from the other mobile devices, which is received by operating the communication unit, and location information of the mobile device. The identification information items of the detected other mobile devices are registered as a group in the group registration unit. In this way, since the identification information items of all the other mobile devices within a predetermined range of the mobile device are registered as a group, the plurality of mobile devices in the vicinity can be handled as a group. By forming a group, for example, a mobile device can be prevented from being misplaced, a common interface can be used for the mobile devices, and data held by the mobile devices can be linked.

In the above-described mobile device system, at least one of the mobile devices includes a notification unit configured to provide a notification of information about other mobile devices associated with the identification information registered as a group in the group registration unit.

According to this structure, since the notification unit provides a notification of information about other mobile devices associated with the identification information registered as a group in the group registration unit, a notification about the other mobile devices within the predetermined range can be provided.

In this way, for example, when the user is carrying a first mobile device, a notification of other second mobile devices carried together with the first mobile device is provided from the notification unit. Thus, the user can view the notification unit to confirm the mobile devices he or she is carrying, without searching his or her clothes and bag.

As a notification method, for example, a display unit configured to visually provide a notification or an audio output unit configured to provide an audible notification may be employed.

In the above-described mobile device system, each mobile device may include an announcing unit configured to provide a notification when the number of identification information items registered as a group in the group registration unit of the mobile device changes.

According to this structure, when a second mobile device that was in a predetermined range moves out the range due to misplacement and so on, the number of identification information items registered in the group registration unit changes, and a notification of this change is provided by the announcing unit. Therefore, by this notification, the user can quickly notice that a mobile device has been misplaced.

In the above-described mobile device system, each mobile device may include an announcing unit configured to provide a notification when the combination of identification information items registered as a group in the group registration unit of the mobile device changes.

According to this structure, when a second mobile device that was in a predetermined range moves out the range due to misplacement and so on, the combination of the identification information items registered in the group registration unit changes, and a notification of this change is provided by the announcing unit. Therefore, by this notification, the user can quickly notice that a mobile device has been misplaced.

A mobile device according to the present invention includes a location-information acquisition unit configured to acquire location information, a communication unit configured to communicate with other mobile devices, and a group registration unit. The communication unit links location information acquired by the location-information acquisition unit of the mobile device and the identification information of the mobile device, sends the information to other mobile devices, and receives from the other mobile devices location information of the other mobile devices and identification information linked to the location information of the other mobile devices. The group registration unit detects other mobile devices located within a predetermined range of the mobile device on the basis of the location information of the other mobile devices received by the communication unit and the location information of the mobile device and registers the identification information of the detected other mobile devices as a group.

According to this structure, the communication unit is operated to link the location information acquired by the location-information acquisition unit of a first mobile device to the identification information of the first mobile device and to send the information. In this way, a notification about location information of the first mobile device can be sent to second mobile devices. When location information of the second mobile devices is received by operating the communication unit, the second mobile devices within the predetermined range of the first mobile device are detected on the basis of the location information of the second mobile devices and the location information of the first mobile device, and the identification information of the detected second mobile devices are registered in the group registration unit. In this way, since the identification information of all of the second mobile devices within the predetermined range of the first mobile device is registered as a group, the plurality of mobile devices in the vicinity can be handled as a group. By registering a group, for example, a mobile device can be prevented from being misplaced, and a common interface for the mobile devices and linking of data held by the mobile devices (i.e., data link) can be provided.

In the above-described mobile device, the first mobile device may include a notification unit configured to provide a notification for information of other mobile devices associated with the identification information registered as a group in the group registration unit.

According to this structure, since the notification unit provides a notification of information about second mobile devices in association with the identification information registered as a group in the group registration unit, a notification of the second mobile devices within the predetermined range can be provided to a first mobile device.

In this way, for example, when the user is carrying the first mobile device, a notification of the second mobile devices carried together with the first mobile device is provided by the notification unit. Therefore, by viewing the notification unit, the user can confirm which mobile devices he or she is carrying, without searching his or her clothes and bag.

As a notification method, for example, a display unit configured to visually provide a notification or an audio output unit configured to provide an audible notification may be employed.

The above-described mobile device may include an announcing unit configured to provide a notification when the number of identification information items registered as a group in the group registration unit of the mobile device changes.

According to this structure, when a second mobile device that was within a predetermined range moves out of range due to misplacement and so on, the number of identification information items registered in the group registration unit changes, and a notification of this change is provided by the announcing unit. Therefore, by this notification, the user can quickly notice that a mobile device has been misplaced.

The above-described mobile device may include an announcing unit configured to provide a notification when the combination of identification information items registered as a group in the group registration unit of the mobile device changes.

According to this structure, when a second mobile device that was within a predetermined range moves out of range due to misplacement and so on, the combination of the identification information items registered in the group registration unit changes, and a notification of this change is provided by the announcing unit. Therefore, by this notification, the user can quickly notice that a mobile device has been misplaced.

The various aspects described above can be used in combination within the scope of the present invention.

According to the above-described mobile device system or mobile device, even when the user carries a different combination of mobile devices on different days, the mobile devices carried together by the user on a particular day can be flexibly handled as a group.

Embodiments of a mobile device system will be described below with reference to the drawings.

FIG. 1 illustrates an example structure of a mobile device system 1. As shown in the drawing, the mobile device system 1 includes a plurality of mobile devices or, more specifically, a mobile phone 3, a portable music player 4, a PDA 5, and a laptop computer (hereinafter referred to as 'computer') 6. Unique identification information is assigned to each mobile device.

These mobile devices are only examples, and any type of portable electronic device may be used in any combination. For example, an example of a mobile device is a wearable personal computer that is embedded in clothes.

Figures 2, 3:
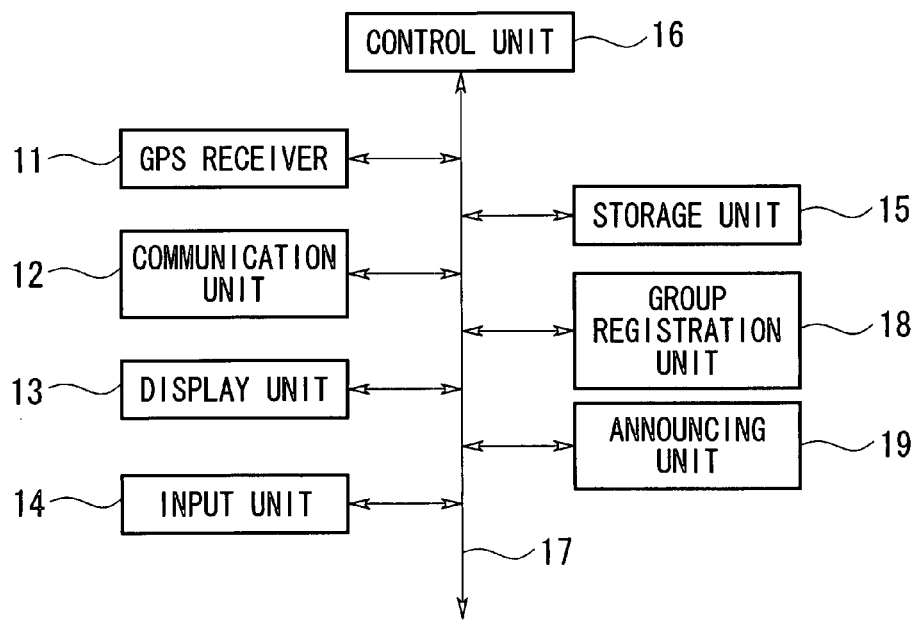
FIG. 2 illustrates common components included in each mobile device of the mobile device system.
FIG. 3 illustrates example information stored in a storage unit of a mobile phone.

Each of the above-described mobile devices includes the following common components. More specifically, as illustrated in FIG. 2, each mobile device includes a GPS receiver (location-information acquisition unit) 11, a communication unit (communication device) 12, a display unit (notification unit) 13, an input unit 14, a storage unit 15, a control unit (control device) 16, a group registration unit 18, and an announcing unit 19. These units are mutually connected via a bus 17 and are capable of sending and receiving information between each other.

The components may be provided separately from components that are generally included in each mobile device, or the components that are generally included in each mobile device may also serve as the above-described components. For example, since the mobile phone 3 generally includes a communication unit, a display unit, and an input unit, any of these units that are the same as the common components may preferably be shared. This also applies to the other mobile devices.

The GPS receiver 11 periodically receives a signal from a GPS satellite, acquires location information of the mobile device including the GPS receiver 11 on the basis of the received signal, and outputs the location information to the control unit 16. The communication unit 12 is capable of communicating with other mobile devices by wireless communication. For example, the communication unit 12 of the mobile phone 3 is capable of communicating with the portable music player 4, the PDA 5, and the computer 6.

The display unit 13 is, for example, a liquid crystal display. The input unit 14 is, for example, keys or buttons and functions as a man-machine interface.

The storage unit 15 holds information about the other mobile devices. More specifically, the storage unit 15 holds identification information for each mobile device. Various kinds of information, including the name of the mobile device, information for enabling two-way communication, and image data to be displayed on the display unit 13, are linked to the identification information of each mobile device. The information for enabling two-way communication is, for example, an IP address of the receiver. The image data displayed on the display unit 13 is, for example, icons or text information. For example, as shown in FIG. 3, identification information of the portable music player 4, the PDA 5, and the computer 6 is stored in the storage unit 15 of the mobile phone 3. The device name, ID address, and image data to be displayed on the display unit 13 are linked to the identification information of the other mobile devices. The control unit 16 performs overall control of the above-described units.

Identification information of the other mobile devices within a predetermined range of the mobile device is registered in the group registration unit 18.

When the combination of the other mobile devices within a predetermined range changes, the announcing unit 19 notifies the user. For example, a light-emitting diode (LED) that can be illuminated, a speaker that can emit sound, or a vibration motor that can be vibrated may be employed as the announcing unit 19 to notify the user.

Figure 4:
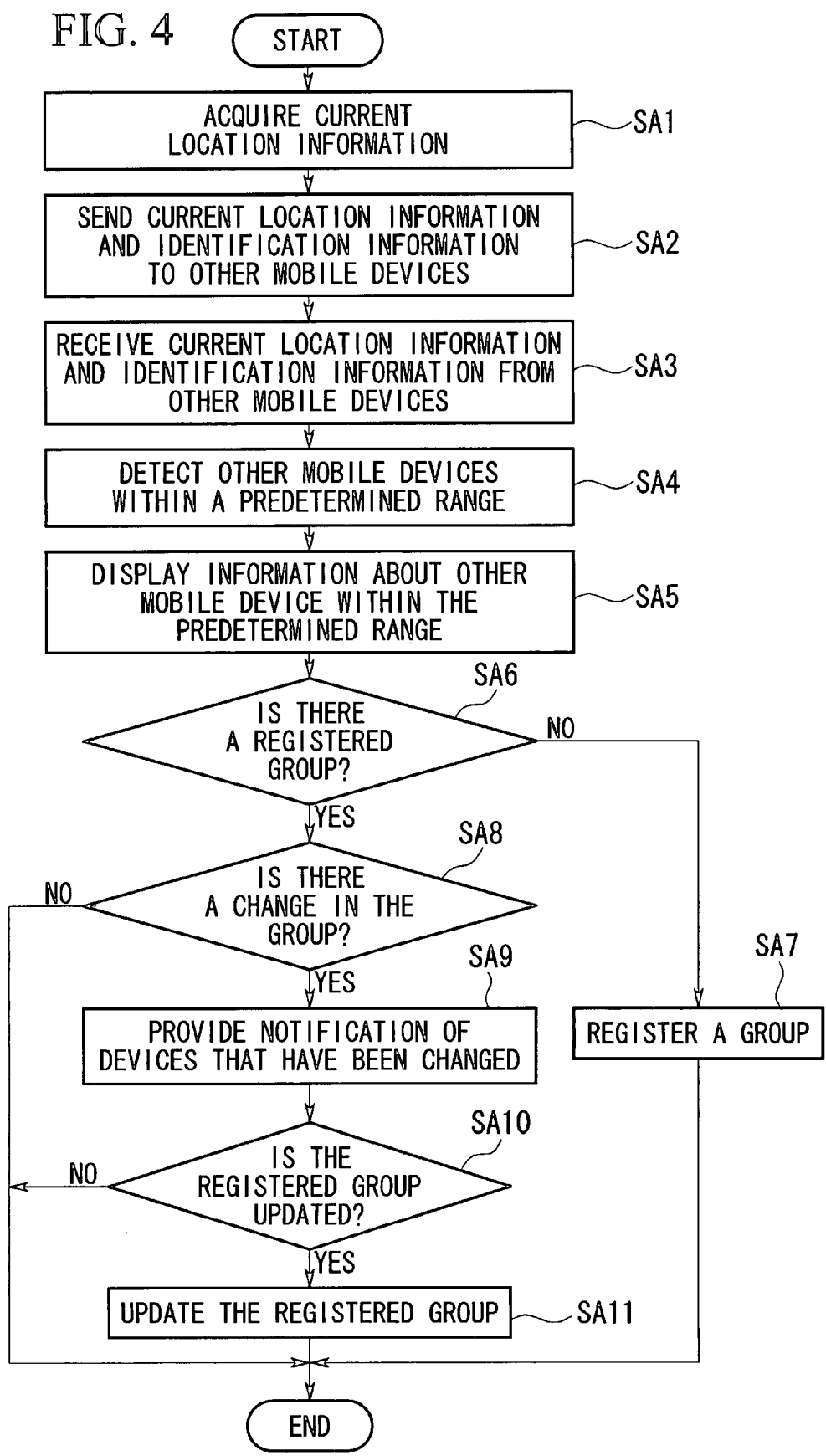
FIG. 4 is a flow chart illustrating the steps of a misplacement detection process executed in a control unit.

In the mobile devices having such common structures, the control units 16 repeatedly execute a misplacement detection process, as shown in FIG. 4, at predetermined intervals. Although the process described below is executed in the control unit 16 of each mobile device, for simplification, the process executed by the control unit 16 of the mobile phone 3 will be described as a representative example.

First, when location information acquired by the GPS receiver 11 is input to the control unit 16 of the mobile phone 3 (Step SA1 of FIG. 4), information linking the location information to an identification number "0003" of the mobile phone 3 is sent to other mobile devices from the communication unit 12 (Step SA2). In this way, the current location information and the identification information of the mobile phone 3 are sent to the portable music player 4, the PDA 5, and the computer 6. At the same time, the same process is executed in the control units 16 of the portable music player 4, the PDA 5, and the computer 6 so as to mutually send and receive the current location information of the mobile devices. In this way, the communication unit 12 of the mobile phone 3 receives the identification information and the current location information of the portable music player 4, the PDA 5, and the computer 6 (Step SA3).

Subsequently, on the basis of the received current location information of the portable music player 4, the PDA 5, and the computer 6 and the current location information of the mobile phone 3, the control unit 16 of the mobile phone 3 determines whether or not the portable music player 4, the PDA 5, and the computer 6 are within a predetermined range of the mobile phone 3 and detects the mobile devices located within the predetermined range (Step SA4). Here, the predetermined range is a range for determining whether other mobile devices are carried together with another mobile device and can be set arbitrarily according to the design. For example, the range can be set between approximately 3 and 5 m.

Then, the control unit 16 acquires icons linked to the identification information of the other mobile devices determined to be within the predetermined range from the storage unit 15 and displays the icons on the display unit 13 (Step SA5). In this way, icons of the other mobile devices within the predetermined range of the mobile phone 3 are displayed on the display unit 13.

Figure 5:
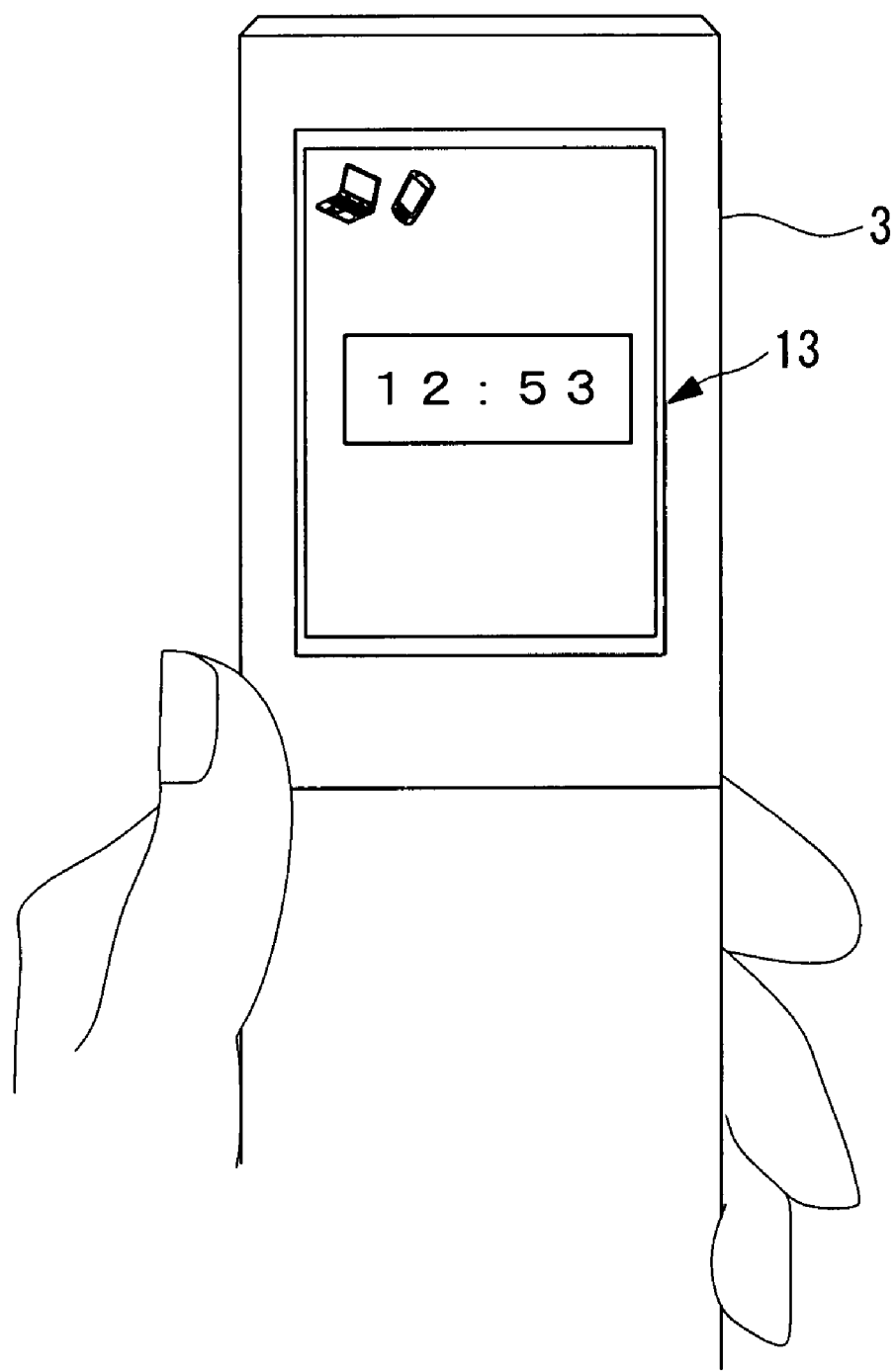
FIG. 5 illustrates an example display when a personal digital assistant (PDA) and a personal computer are within a predetermined range of the mobile phone.

For example, FIG. 5 illustrates an example display on the display unit 13 when the PDA 5 and the computer 6 are determined to be within the predetermined range. Accordingly, the user can view the display to confirm that he or she is carrying the PDA 5 and the computer 6 and is not carrying the portable music player 4.

Subsequently, the control unit 16 determines whether or not a group has been registered in the group registration unit 18. Since a group still has not yet been registered, the process proceeds to Step SA7. The identification information of the other mobile devices determined to be within the predetermined range in Step SA4 is registered to the group registration unit 18.

For example, if the PDA 5 and the computer 6 are determined to be within the predetermined range of the mobile phone 3 in Step SA4, the identification number "0005" of the PDA 5 and the identification number "0006" of the computer 6 are registered as a group in the group registration unit 18 of the mobile phone 3, and the process ends.

Next, after a predetermined amount of time, the control unit 16 executes the misplacement detection process shown in FIG. 4 again.

In this way, as described above, other mobile devices within the predetermined range of the mobile phone 3 are detected, and information about these mobile devices is displayed on the display unit 13 (Steps SA1 to SA5). Then, in Step SA6, the control unit 16 determines whether or not a group has been registered in the group registration unit 18. Since a group is already registered, the process proceeds to Step SA8 so as to determine whether there is a change in the group status. More specifically, the control unit 16 determines whether or not the combination of mobile devices determined to be within the predetermined range of the mobile phone 3 through the above-described process matches the combination of mobile devices registered in the group registration unit 18. As a result, for example, if the PDA 5 and the computer 6 are determined to be within the predetermined range through this process, it is determined in Step SA8 that there is no change in the group status, and then the process ends.

When there is a change in the combination of mobile devices determined to be within the predetermined range of the mobile phone 3 and when the combination of mobile devices detected in Step SA4 differs from the combination of mobile devices registered as a group, the control unit 16 operates the announcing unit 19 to notify the user (Step SA9). In this way, the user is notified of when the number of mobile devices he or she is carrying changes and which mobile devices has been added or taken away. As a result, the user can quickly notice a misplaced mobile device. In such a case, since the mobile devices currently being carried by the user are displayed on the display unit 13, the user can view the display and determine which mobile device he or she has misplaced.

Subsequently, the control unit 16 queries the user as to whether or not to update the registered group (Step SA10). This inquiry is carried out by, for example, displaying a message "Update group registration?" on the display unit 13 or providing an audio message. As a result, if there is an input for updating the registered group, the mobile devices detected in Step SA4 of the process are registered as a group in the group registration unit 18 (Step SA11), and then the process ends. If there is no input for updating the registered group in Step SA10, the control unit 16 does not update the registered group, and then the process is completed.

Here, for example, when the user decides to increase the number of mobile devices he or she is carrying or when the user leaves a mobile device behind, then, misplacement of a mobile device must be determined on the basis of the new combination of mobile devices. If the registered group were not updated, the same notification would be provided when the next time the process is executed, and the user would be bothered by this notification. Thus, as described above, convenience can be enhanced by allowing the user to determine whether or not to update the registered group.

Then, the control unit 16 repeatedly executes the misplacement detection process, as shown in FIG. 4, at set intervals to periodically detect misplacement of a mobile device and notifies the result to the user.

As described above, in this mobile device system 1, second mobile devices that are determined to be within the predetermined range of a first mobile device are registered as a group. Thus, even when the user carries a different combination of mobile devices on different days, the mobile devices carried together by the user on a particular day can be flexibly handled as a group.

When there is a change in the group registered in the group registration unit 18, the announcing unit 19 notifies the user. Thus, the user can quickly notice when a mobile device is misplaced.

According to this mobile device system 1, since information about second mobile devices within the predetermined range of a first mobile device is displayed on the display unit 13 of the first mobile device, the user can confirm which second mobile devices he or she is carrying by viewing the display unit 13 of the first mobile device, without searching his or her bag and clothes. Since information about second mobile devices outside the predetermined range of the first mobile device is not displayed on the display unit 13, for example, when the announcing unit 19 provides a notification, the user can determine which of the second mobile devices has been misplaced by viewing the display unit 13.

Furthermore, since information on second mobile devices within the predetermined range of a first mobile device is displayed on the display units 13 of not only one mobile device but all of the first and second mobile devices when the user views the display unit 13 of any of the mobile devices, the user can easily confirm the mobile devices he or she is carrying together by viewing the display unit 13 of any of the mobile devices.

According to this embodiment, the user is notified about second mobile devices within a predetermined range of a first mobile device by displaying such information on the display unit 13. Instead, however, the user may be notified by an audio message. In such a case, in addition to the components shown in FIG. 2, an audio output unit, such as a speaker, configured to output sound is provided.

According to this embodiment, whether or not a group has changed is determined on the basis of whether or not the combination of identification information registered in the group registration unit 18 has changed. Instead, however, it can be determined that a group has changed when the number of identification information items registered in the group registration unit 18 is changed. In this way, the processing load can be reduced compared with a case where the identification information items are compared.

According to the above-described embodiment, the control unit 16 detects second mobile devices within a predetermined range of a first mobile device on the basis of the location information of the second mobile devices and the location information of the first mobile device. Instead, however, this detection may be carried out by the group registration unit 18. Furthermore, the control unit 16 may include the function of the group registration unit 18. In this way, this is satisfactory so long as the first mobile device has a function of detecting the second mobile devices within the predetermined range of the mobile device. Which component is to be provided with this function may be determined according to the design.

According to the above-described embodiment, a case in which group registration is used for preventing misplacement has been described. Instead, however, group registration can be used for, for example, a common interface (e.g., network connection and screen input) for the mobile devices and linking of data held by the mobile devices (i.e., data link).

Embodiments of the mobile device system and mobile devices have been described above in detail with reference with the drawings. However, specific structures are not limited to the above-described embodiment, and modifications which do not depart from the spirit of the invention may be made.

What is claimed is:
1. A mobile device system comprising:

a plurality of mobile devices associated with a predetermined user, to each of which unique identification information is assigned, wherein each mobile device in the plurality of mobile devices includes a control unit configured to repeatedly execute detection of a misplaced mobile device at a set periodic interval, a storage unit configured to hold the identification information for other mobile devices in the plurality of mobile devices associated with the predetermined user;

a location-information acquisition unit configured to acquire location information, a communication unit configured to communicate only with the other mobile devices of the predetermined user, and a group registration unit, wherein, in the each mobile device, the communication unit links location information acquired by the location-information acquisition unit of the each mobile device and the identification information of the each mobile device, sends the information to the other mobile devices, and receives from the other mobile devices location information of the other mobile devices and identification information linked to the location information of the other mobile devices, and wherein, in the each mobile device, the group registration unit detects the other mobile devices located within a predetermined range of the each mobile device on the basis of the location information of the other mobile devices received by the communication unit and the location information of the each mobile device and registers the identification information of the detected other mobile devices as a group.

2. The mobile device system according to claim 1, wherein at least one of the plurality of the mobile devices includes a notification unit configured to provide a notification of information about the others of the plurality of mobile devices associated with the identification information registered as a group in the group registration unit.

3. The mobile device system according to claim 1, wherein the each mobile device includes an announcing unit configured to provide a notification when the number of identification information items registered as a group in the group registration unit of the each mobile device changes.

4. The mobile device system according to claim 1, wherein the each mobile device includes an announcing unit configured to provide a notification when the combination of identification information items registered as a group in the group registration unit of the each mobile device changes.

5. A mobile device associated with a predetermined user comprising:

a control unit configured to repeatedly execute detection of a misplaced mobile device at a set periodic interval;

a storage unit configured to hold identification information for other mobile devices of the predetermined user; and a location-information acquisition unit configured to acquire location information;

a communication unit configured to communicate only with the other mobile devices of the predetermined user; and a group registration unit, wherein the communication unit links location information acquired by the location-information acquisition unit of the mobile device and the identification information of the mobile device, sends the information to the other mobile devices, and receives from the other mobile devices location information of the other mobile devices and identification information linked to the location information of the other mobile devices, and wherein the group registration unit detects the other mobile devices located within a predetermined range of the mobile device on the basis of the location information of the other mobile devices received by the communication unit and the location information of the mobile device and registers the identification information of the detected other mobile devices as a group.

6. The mobile device according to claim 5, further comprising:

a notification unit configured to provide a notification for information of the other mobile devices associated with the identification information registered as a group in the group registration unit.

7. The mobile device according to claim 5, further comprising:

an announcing unit configured to provide a notification when the number of identification information items registered as a group in the group registration unit of the mobile device changes.

8. The mobile device according to claim 5, further comprising:

an announcing unit configured to provide a notification when the combination of identification information items registered as a group in the group registration unit of the mobile device changes.

* * * * *